(12) United States Patent
Maitra

(10) Patent No.: US 9,448,957 B2
(45) Date of Patent: Sep. 20, 2016

(54) UNIFIED SYSTEM AREA NETWORK AND SWITCH

(71) Applicant: RJ Intellectual Properties, LLC, San Diego, CA (US)

(72) Inventor: Jayanta Kumar Maitra, San Diego, CA (US)

(73) Assignee: GigaIO Networks, Inc., San Diego, CA (US)

( * ) Notice: Subject to any disclaimer, the term of this patent is extended or adjusted under 35 U.S.C. 154(b) by 0 days.

(21) Appl. No.: 14/532,304

(22) Filed: Nov. 4, 2014

(65) Prior Publication Data

US 2015/0052284 A1 Feb. 19, 2015

Related U.S. Application Data

(60) Continuation of application No. 13/860,976, filed on Apr. 11, 2013, now Pat. No. 9,152,597, which is a division of application No. 13/091,749, filed on Apr. 21, 2011, now Pat. No. 8,463,934, which is a continuation-in-part of application No. 12/613,207, filed on Nov. 5, 2009, now Pat. No. 8,359,401.

(51) Int. Cl.
| | |
|---|---|
| *G06F 15/16* | (2006.01) |
| *G06F 13/40* | (2006.01) |
| *H04L 12/931* | (2013.01) |

(Continued)

(52) U.S. Cl.
CPC ....... *G06F 13/4027* (2013.01); *G06F 13/4022* (2013.01); *G06F 13/4221* (2013.01); *H04L 41/0806* (2013.01); *H04L 49/35* (2013.01)

(58) Field of Classification Search
CPC .......... G06F 13/4022; G06F 13/4221; G06F 13/4027; G06F 13/40; G06F 13/42; H04L 49/35; H04L 41/0806
See application file for complete search history.

(56) References Cited

U.S. PATENT DOCUMENTS

| | | |
|---|---|---|
| 5,537,585 A | 7/1996 | Blickenstaff et al. |
| 5,684,918 A | 11/1997 | Abecassis |
| 5,706,502 A | 1/1998 | Foley et al. |

(Continued)

FOREIGN PATENT DOCUMENTS

| | | |
|---|---|---|
| EP | 1328104 A2 | 7/2003 |

OTHER PUBLICATIONS

European communication dated Mar. 16, 2015 in corresponding European patent application No. 10828685.7 (793P001 Europe).

(Continued)

*Primary Examiner* — Arvin Eskandarnia
(74) *Attorney, Agent, or Firm* — Nields, Lemack & Frame, LLC

(57) ABSTRACT

A network switch, based on the PCI Express protocol, is disclosed. The switch includes a processor, local memory and a plurality of non-transparent bridges. By configuring the non-transparent bridges appropriately, the network switch can facilitate a number of different communication mechanisms, including TCP/IP communication between servers, server clusters, and virtualized I/O device utilization. For example, the network switch may configure the non-transparent bridges so as to have access to the physical memory of every server attached to it. It can then move data from the memory of any server to the memory of any other server. In another embodiment, the network switch is connected to an I/O device, and multiple servers are given access to that I/O device via virtualized connections.

3 Claims, 13 Drawing Sheets

(51) Int. Cl.
*H04L 12/24* (2006.01)
*G06F 13/42* (2006.01)

(56) References Cited

U.S. PATENT DOCUMENTS

| | | | |
|---|---|---|---|
| 5,761,663 | A | 6/1998 | Lagarde et al. |
| 5,768,528 | A | 6/1998 | Stumm |
| 5,832,522 | A | 11/1998 | Blickenstaff et al. |
| 5,832,523 | A | 11/1998 | Kanai et al. |
| 5,835,667 | A | 11/1998 | Wactlar et al. |
| 5,850,442 | A | 12/1998 | Muftic |
| 6,332,025 | B2 | 12/2001 | Takahashi et al. |
| 6,438,353 | B1 | 8/2002 | Casey-Cholakis et al. |
| 7,421,532 | B2* | 9/2008 | Stewart ............... H04L 49/3009 710/306 |
| 7,480,303 | B1* | 1/2009 | Ngai ..................... H04L 49/351 370/395.5 |
| 7,814,259 | B2* | 10/2010 | Stewart ............... H04L 49/3009 710/306 |
| 7,913,019 | B2* | 3/2011 | Inagawa ............... G06F 11/006 710/104 |
| 7,913,027 | B2* | 3/2011 | Kloeppner ............ G06F 13/385 710/316 |
| 8,359,401 | B2 | 1/2013 | Maitra |
| 8,463,934 | B2 | 6/2013 | Maitra |
| 8,868,777 | B2 | 10/2014 | Maitra |
| 2005/0117578 | A1* | 6/2005 | Stewart ............... H04L 49/3009 370/389 |
| 2006/0069926 | A1 | 3/2006 | Ginter et al. |
| 2006/0126612 | A1 | 6/2006 | Sandy et al. |
| 2008/0044141 | A1 | 2/2008 | Willis et al. |
| 2008/0052443 | A1* | 2/2008 | Cassiday ............. G06F 13/4022 710/316 |
| 2008/0141039 | A1 | 6/2008 | Matze |
| 2008/0181213 | A1 | 7/2008 | Ovsiannikov et al. |
| 2008/0288664 | A1 | 11/2008 | Pettey et al. |
| 2008/0288772 | A1 | 11/2008 | Matze |
| 2008/0304504 | A1 | 12/2008 | Stewart et al. |
| 2009/0070405 | A1* | 3/2009 | Mazzaferri ............. G06F 9/542 709/202 |
| 2009/0154456 | A1* | 6/2009 | Dodson ................... H04L 47/10 370/389 |
| 2011/0072204 | A1* | 3/2011 | Chang ................ G06F 12/0284 711/103 |
| 2011/0107004 | A1 | 5/2011 | Maitra |
| 2011/0202701 | A1 | 8/2011 | Maitra |
| 2013/0227093 | A1 | 8/2013 | Maitra |
| 2013/0227193 | A1 | 8/2013 | Maitra |

OTHER PUBLICATIONS

PCI-Express, PCI-SIG Developers Conference 2008, Jun. 1, 2008, pp. 1-29, XP055165214, "Using PCIe over Cable for High Speed CPU-to-CPU Communications", COOPER.

PLX Technology White Paper, "PEX 8619 DMA Performance Metrics, 16-Lane; 16-Port Gen 2 PCIe Switch with Integrated DMA Engine", Oct. 29, 2009, Version 1.0, pp. 1-37, by PLX TECHNOLOGY.

PLX Technology White Paper, "Non-Transparent Mode: Setup & Demonstration", Apr. 5, 2009, Version 1.0, pp. 1-9, by Carter BUCK.

PLX Technology White Paper, "Using Non-transparent Bridging in PCI Express Systems", Jun. 1, 2004, pp. 1-31, by Jack REGULA.

Dolphin Interconnect Solutions White Paper, "Towards a Comprehensive PCI Express Clustering Solution: TCP/IP over PCI Express", Revision 0.5, Apr. 18, 2007, pp. 1-9, by Venkata KRISHNAN.

RTC Magazine, Technology Connected/Advances with PCI Express, Oct. 2010, "System Area Network Speeds Data Transfer between Servers with PCI Express", 5 pages, by Joey MAITRA, Magma.

IDT White Paper, (2008), "Using PCI Express as the Primary System Interconnect in Multiroot Compute, Storage, Communications and Embedded Systems", pp. 1-13, by Kwok KONG.

IDT Application Note, AN-510, Jan. 23, 2007, "Use of Non-transparent Bridging with IDT PCI Express NTB Switches", pp. 1-19, by Kwok KONG.

IDT Application Note, AN-531, Dec. 19, 2007, "PCI Express System Interconnect Software Architecture", pp. 1-20, by Kwok KONG.

PLX Technology/Express Apps, Issue No. 17, Sep. 2005, Application: Processor Isolation in NAS Gateways, PLX Product: PEX 8508-8-lane PCT Express Switch, Sep. 2005, 2 pages.

PLX Technology/NTB Brief, "Non-Transparent Bridging Simplified, Multi-Host System and Intelligent I/O Design with PCI Express", 2004, 4 pages.

Office Action mailed Jul. 17, 2014 in corresponding parent U.S. Appl. No. 13/860,976.

Final Rejection mailed Jan. 21, 2015 in corresponding parent U.S. Appl. No. 13/860,976.

Notice of Allowance mailed Jul. 22, 2015 in co-pending U.S. Appl. No. 13/860,976.

Notice of Allowance mailed Aug. 11, 2015 in co-pending U.S. Appl. No. 13/860,976.

* cited by examiner

UNIFIED SYSTEM AREA NETWORK AND SWITCH

This application is a continuation of U.S. patent application Ser. No. 13/860,976 filed Apr. 11, 2013, which is a divisional of U.S. patent application Ser. No. 13/091,749 filed Apr. 21, 2011 (now U.S. Pat. No. 8,463,934 issued Jun. 11, 2013), which is a continuation-in-part of U.S. patent application Ser. No. 12/613,207, filed Nov. 5, 2009 (now U.S. Pat. No. 8,359,401 issued Jan. 22, 2013), the disclosures of which are incorporated herein by reference in its entirety.

BACKGROUND OF THE INVENTION

Over time, various interconnects and protocols have been developed to address the various interconnectivity issues associated with computing. Several examples of interconnectivity include server-based clustering, storage networks, intranet networks, and many others.

Today, it is common for a single installation to have a plurality of interconnects for these various interconnectivity solutions. For example, FIG. 1 shows a typical environment where a plurality of servers 10a, 10b, 10c are connected to each other via high speed Ethernet, such as through a switch 20. This switch 20 allows the various servers to exchange data with each other. This switch 20 may also connect to a second switch or gateway 30, which provides a second interface, such as FibreChannel to the storage devices 40a, 40b.

In another embodiment, such as that shown in FIG. 2, a cluster switch 50 is used to connect a plurality of servers, such as mail server 60a, application server 60b and data base server 60c together.

FIG. 3 shows a typical computer architecture, showing the interconnect between two servers, such as servers 10a, 10b of FIG. 1. In this embodiment, there is an Ethernet controller 70a, 70b, in each server 10a, 10b, These controllers 70a, 70b each communicate with the switch 20. In many instances, the Ethernet controllers use a PCI, or PCI Express interface to connect to the motherboard 80a, 80b of the respective server 10a, 10b.

Therefore, in operation, the CPU on the server 10a generates a message that it wishes to send to another node, such as server 10b. It creates the data payload, or application layer payload. In many embodiments, TCP/IP is used as the transport protocol. Therefore, the message body is encapsulated with TCP overhead and IP overhead. If the Ethernet controller 70a utilizes PCI Express interface, a PCI Express link packet of the datalink layer will be appended at the physical layer prior to its transmission to Ethernet controller 70a. FIG. 4 shows a typical PCI Express path carrying TCP/IP packets, with each of these components.

Once the Ethernet controller 70a receives the packet from the server 10a, it must strip off the PCI Express overhead information. The Ethernet controller driver parses the data stream to retrieve the destination IP address. It then associates an Ethernet ID of the destination IP address and appends that to the Ethernet frame. It then appends traditional Ethernet overhead. FIG. 5 shows the format of a typical Ethernet format packet. The controller 70a then transmits the packet to switch 20.

At the switch 20, the Ethernet overhead is stripped off, and the switch 20 determines through which port the packet should be transmitted, based on the destination address. The switch then creates a new Ethernet overhead that is appended to the packet, and it is transmitted to server 10b.

Server 10b receives the packet, strips off the Ethernet overhead. It then embeds the data payload in PCI Express datalink and via PCI Express physical layer, prepares to send the data to the CPU on server 10b. Once the data reaches the motherboard 80b, the data payload is extracted from the PCI Express datalink from the physical layers and the packet is stored in memory as a TCP/IP packet, where the CPU can parse it and act upon it.

Looking at FIG. 3, it can be seen that, in theory, there is a virtual connection between the PCI Express physical layers of the two servers 10a, 10b. In other words, all of the other components are simply necessary to add and remove overhead information to allow the packet to move from the PCI Express port on the motherboard of server 10a to the PCI Express port on the motherboard of server 10b.

Similar architectures exist for other interconnect strategies, where the packet is translated from PCI Express to another protocol to allow transmission from the network adapter to another device. The second device then removes the overhead associated with the other protocol and generates a PCI Express format message for transfer to the CPU of the device.

Therefore, it would be beneficial if there were a method and system that could transmit information between multiple devices without the need to utilize multiple formats and interconnects for these transmissions.

SUMMARY OF THE INVENTION

A network switch, based on the PCI Express protocol, is disclosed. The switch includes a processor, local memory and a plurality of non-transparent bridges and, optionally transparent bridges leading to PCI Express endpoints. By configuring the non-transparent bridges appropriately, the network switch can facilitate a number of different communication mechanisms, including TCP/IP communication between servers, server clusters, and virtualized I/O device utilization. For example, the network switch may configure the non-transparent bridges so as to have access to the physical memory of every server attached to it. It can then move data from the memory of any server to the memory of any other server. In another embodiment, the network switch is connected to an I/O device, and multiple servers are given access to that I/O device via virtualized connections.

DETAILED DESCRIPTION OF THE INVENTION

Usually, as described above, in a networked environment, there are various higher-level protocols used by the respective applications to communicate between computers and devices. For example, the TCP/IP protocol is used extensively in current intranet and internet infrastructure.

Figure 1:
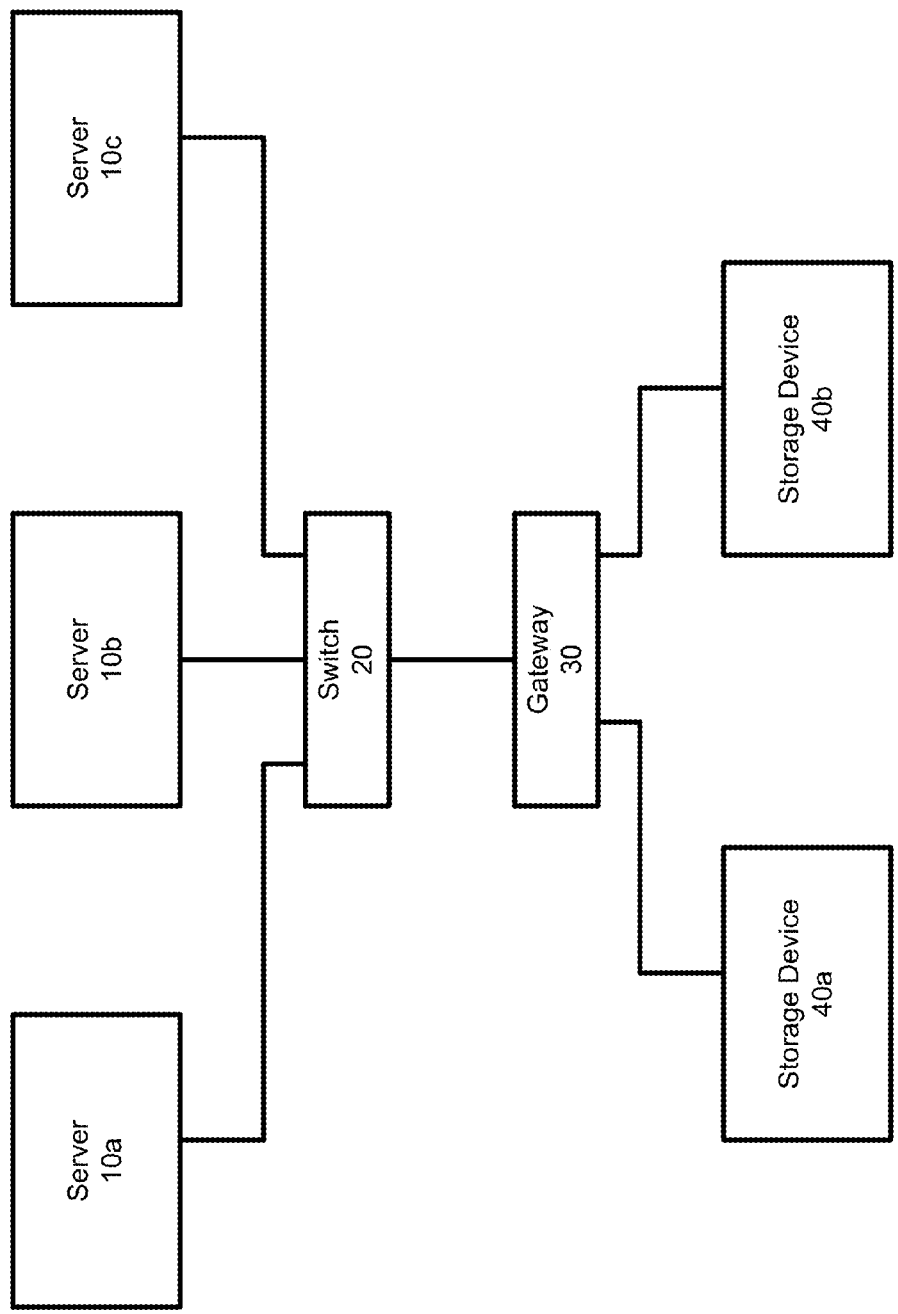
FIG. 1 is a first computer architecture of the prior art.
Figure 2:
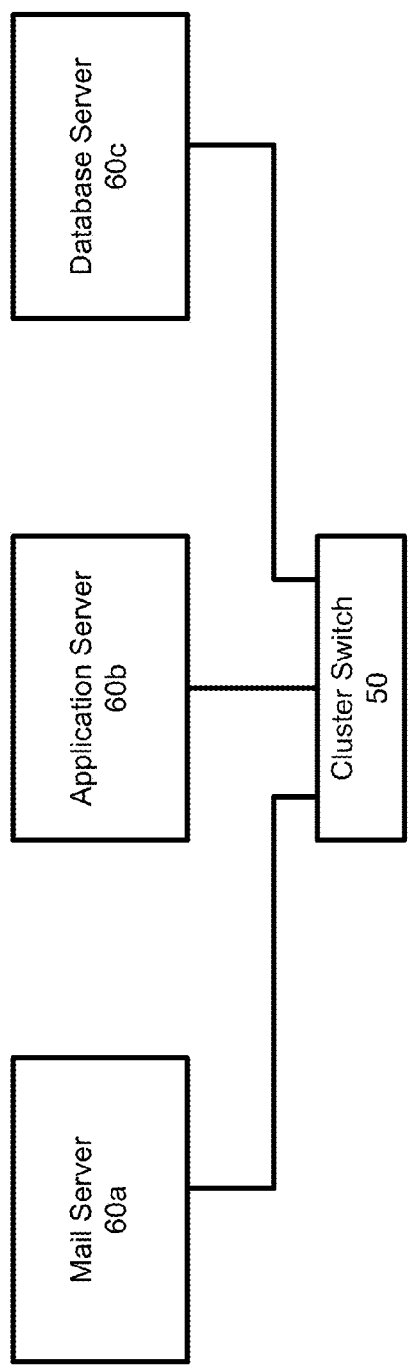
FIG. 2 is a second computer architecture of the prior art.
Figure 3:
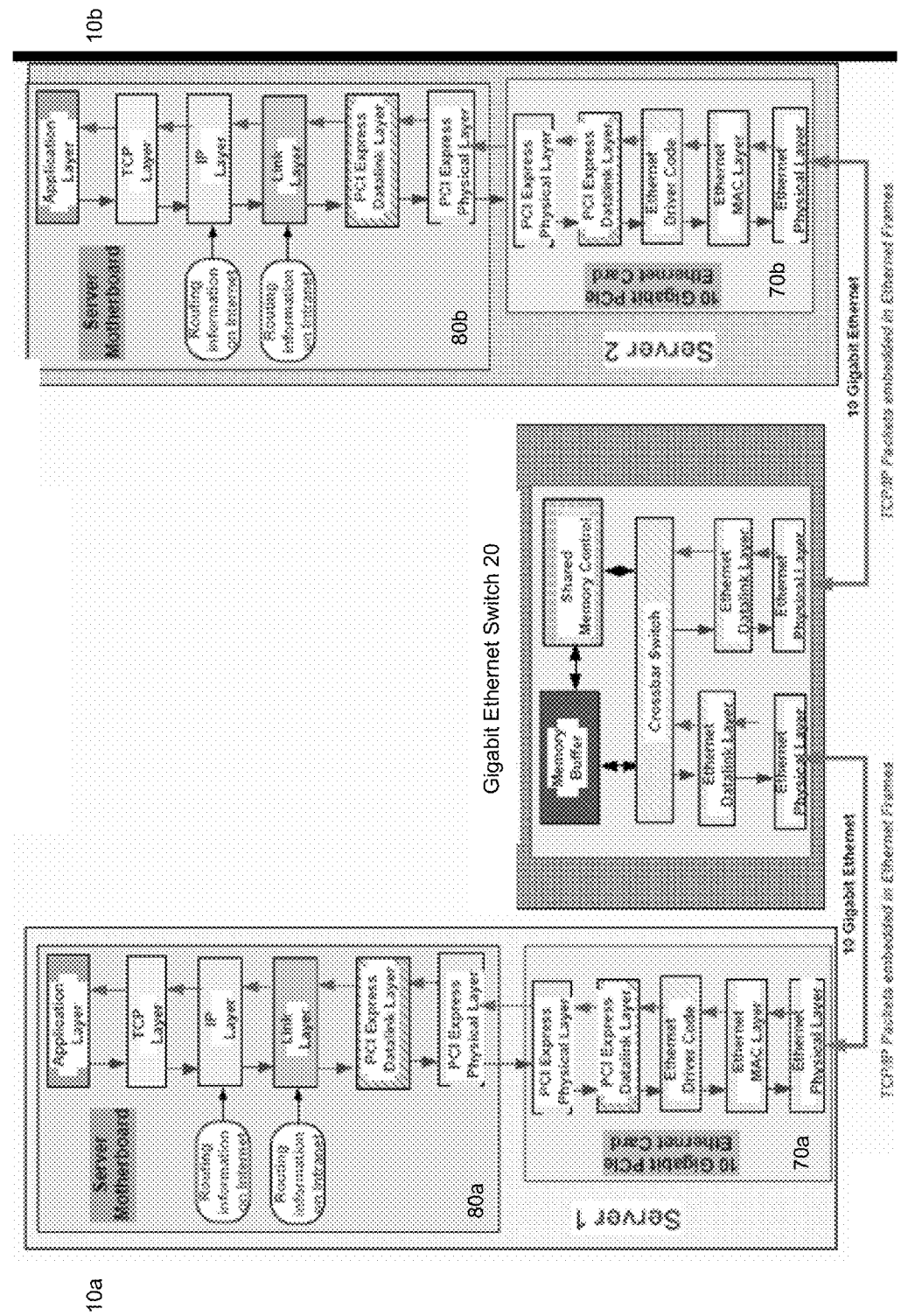
FIG. 3 is a diagram shows the software and hardware interactions in a data transmission in the architecture of FIG. 1.
Figure 4:
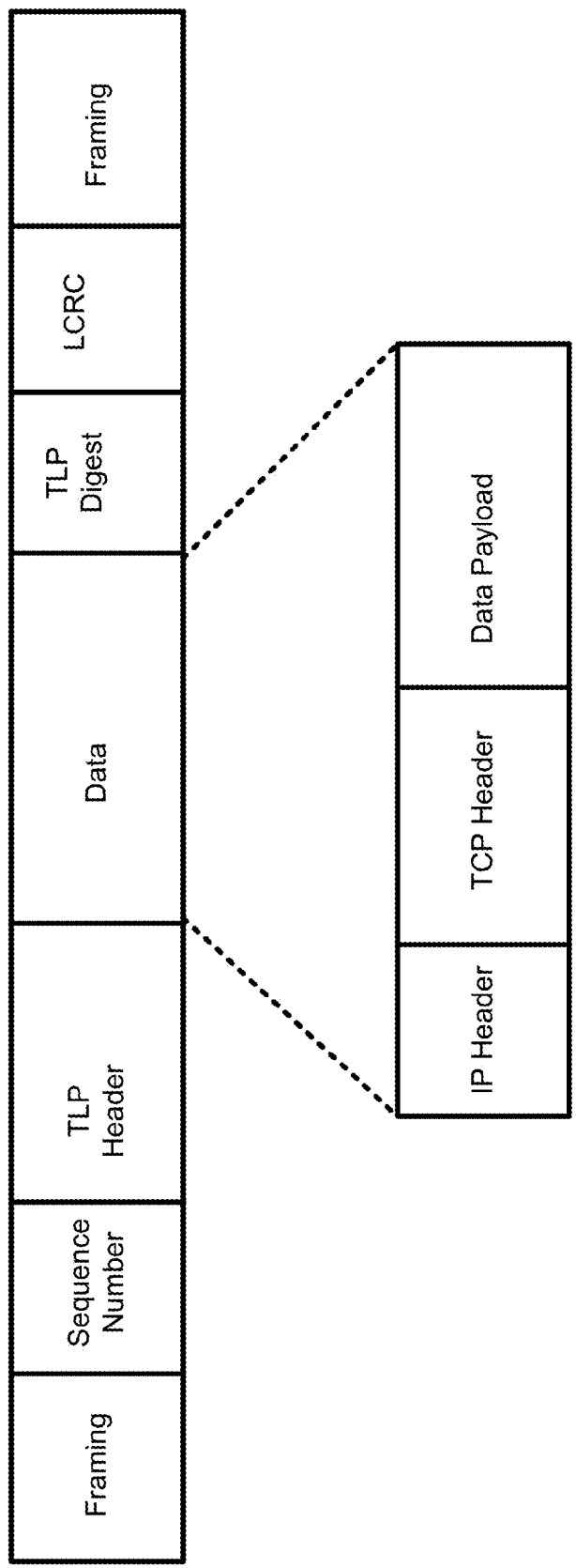
FIG. 4 is a packet showing the PCI Express format.
Figure 5:
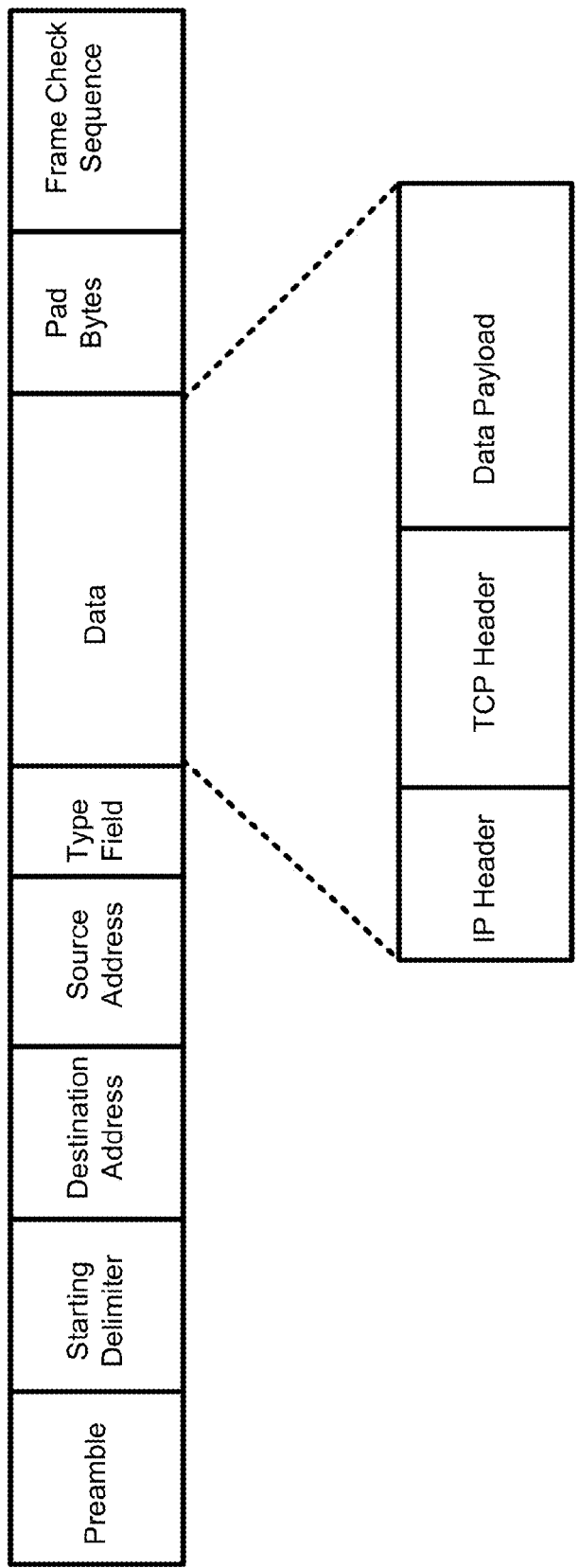
FIG. 5 is a packet showing the Ethernet format.

These various higher-level protocols are often transmitted over a variety of different interconnects, such as Ethernet, FibreChannel, ATM, or proprietary interfaces. To utilize multiple interfaces, it is often necessary to utilize network adapters, which convert one protocol and interface to a second set. When these adapters are incorporated in a computer, they often communicate with the processor using an interface and protocol known as PCI Express. For example, an Ethernet network adapter may be installed in a server, whereby it communicates with the server root complex using PCI Express as the transmission interface. It then sends packets to other devices, after having properly converted those packets to a suitable Ethernet format. Similarly, upon receipt of an Ethernet packet, the adapter removes the Ethernet overhead and constructs a PCI Express packet which can be delivered to the root complex of the server. The various packet formats are shown in FIGS. 4 and 5.

A new network switch utilizing PCI Express as the interconnection between servers, storage devices and other networked devices is disclosed. This switch relies on the robust layered packetized protocols implicit in the specification of the PCI Express interconnect mechanism to ensure data integrity. This technology is highly scalable and with PCI Express 2.0, can achieve communication bandwidth of 80 Gigabits/sec (Gb/s), which translates to about 8 Gigabytes/sec (8 GB/s). Future enhancements of PCI Express will increase that throughput to 16 GB/s.

One mechanism that has been used with PCI and PCI Express for a number of years is known as non-transparent bridging. A transparent bridge is a device in which the server, located on one side of the bridge is able to enumerate and communicate with devices on the other side of the bridge. In contrast, a non-transparent bridge does not allow that server to enumerate or communicate with devices on the other side of the non-transparent bridge (NTB). Instead, the NTB acts as an endpoint, which maps a section of memory (or I/O) on one side with a section of memory (or I/O) on the other side. The NTB performs address translation such that the sections of memory on the two sides of the bridge do not need to have the same addresses. Within the configuration space of the NTB are registers defined for message passing between the two sides. In addition, Doorbell Registers can be used to allow the devices on either side of the NTB to generate PCI Express in-band messaging interrupts to one another.

The concept of non-transparent bridging can be used to allow a new network switch, which utilizes PCI Express to perform a multitude of network operations, including TCP/IP communications, clustering, and shared I/O. Each of these operations will be explained in more detail below.

Figure 6:
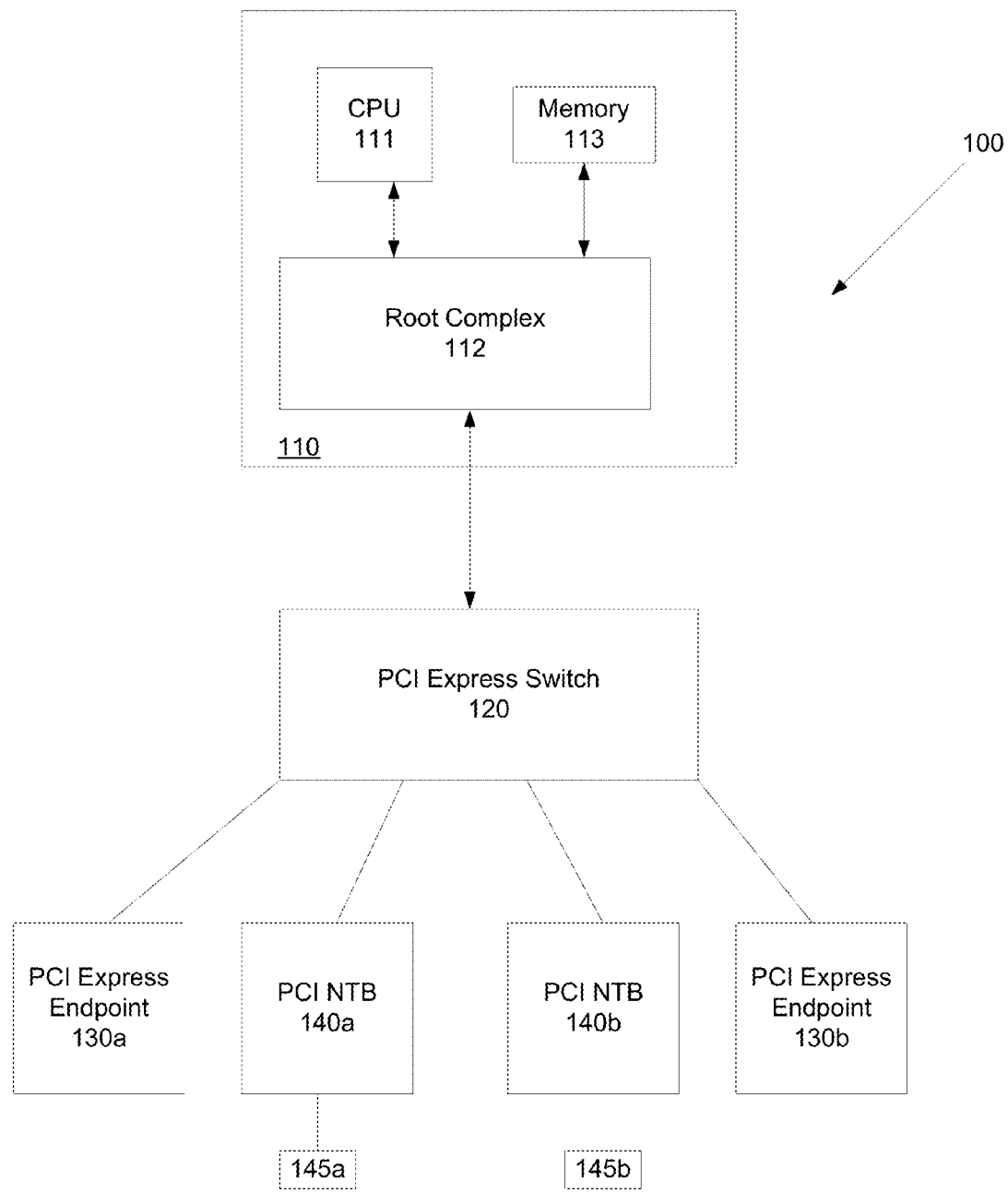
FIG. 6 is a schematic view of the network switch of the present invention.

Referring to FIG. 6, the network switch 100 comprises a central root complex processor (RCP) 110, having a CPU 111, a root complex 112, and a memory element 113. The RCP 110 also communicates with a PCI Express switch 120, which has a plurality of outputs, allowing attachment to a multitude of devices, such as PCI Express endpoints, 130a, 130b, and non-transparent bridges 140a, 140b. The non-transparent bridges 140a, 140b also have a second interface, which may be connected to a connector 145a, 145b or cable for attachment to another device. The second interface of the non-transparent bridge and/or the connector to which it is connected may also be referred to as a port in this disclosure.

Figure 7:
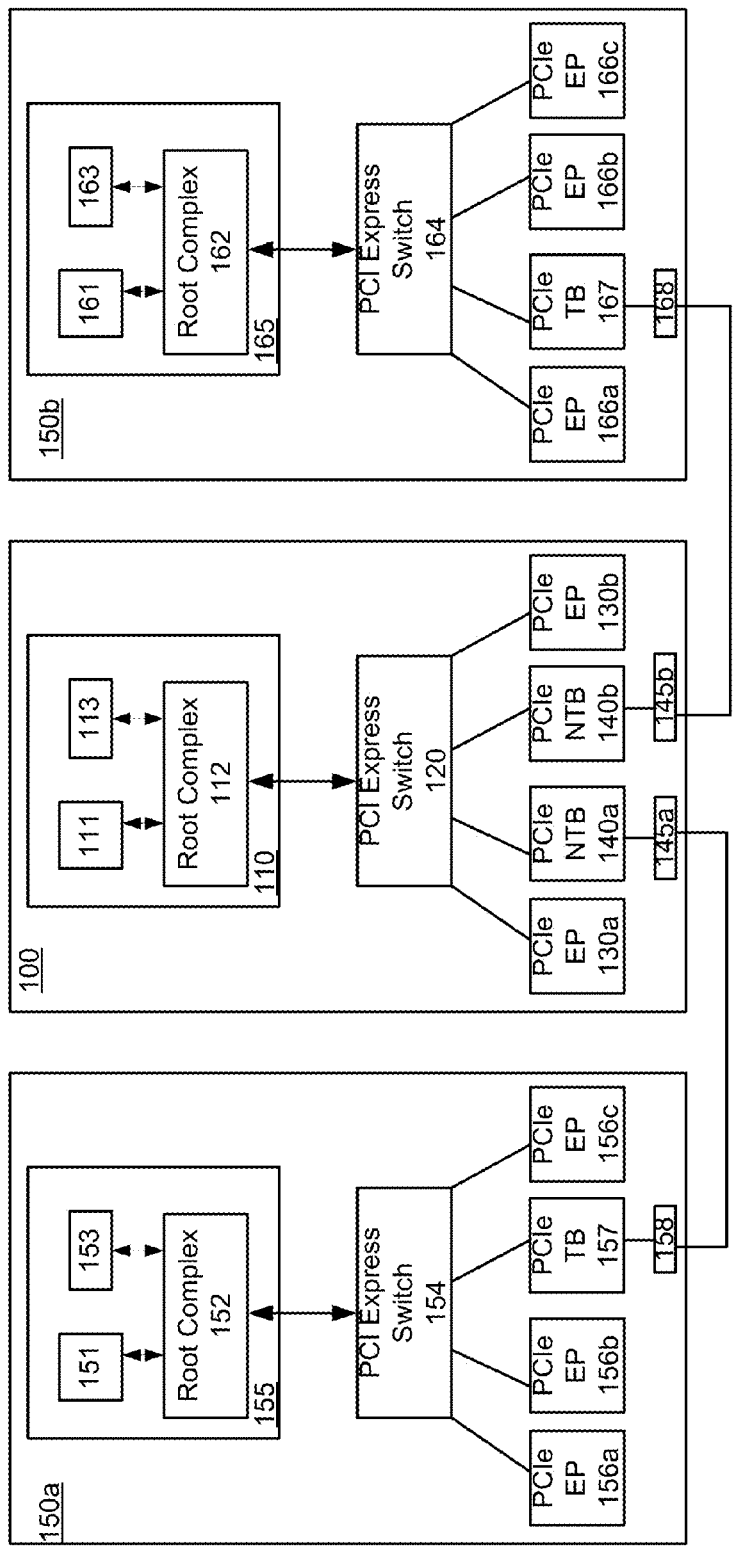
FIG. 7 shows the connection between two servers and the network switch of FIG. 6.

FIG. 7 shows the network switch 100 being attached to two servers 150a, 150b, each via a respective non-transparent bridge 140a, 140b. Server 150a has a root complex processor 155, made up of a CPU 151, a root complex 152, memory 153. A PCI Express switch 154 connects the root complex 155 to a plurality of PCI Express devices. One such device may be a transparent bridge 157, which is attached via a cable to non-transparent bridge 140a of network switch 100. It is noted that while a transparent bridge 157 are shown in the path between PCI Express switch 154 and the non-transparent bridge 140a, this is not required. In other words, the PCI Express switch 154 may have an output, such as a PCI Express End Point, that attaches directly to non-transparent bridge 140a. Server 150b has a corresponding architecture and may be attached to non-transparent bridge 140b of network switch 100 via a transparent bridge 167.

While FIG. 7 shows two servers 150a, 150b, it is understood that the present disclosure is not limited to this number. In fact, any number of servers 150 and other devices may be connected to a network switch 100 via an equal number of dedicated non-transparent bridges (140).

Figure 8:
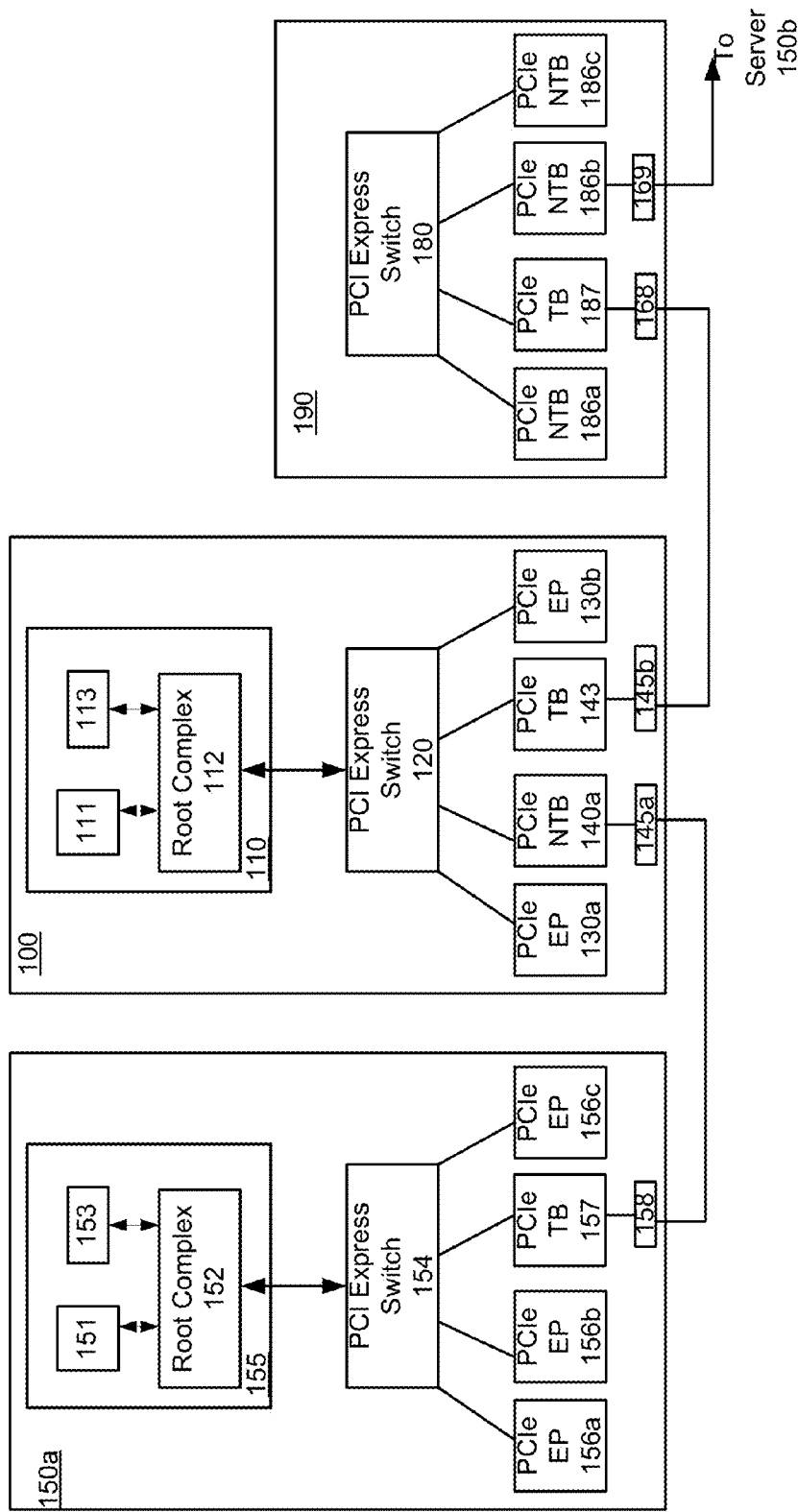
FIG. 8 shows the use of an extension switch to expand the connectivity of the network switch of FIG. 6.

In fact, the network switch can be connected together with one or more extension switches 190 to create a "virtual" network switch having many more ports. FIG. 8 shows a network switch 100 and a server 150a. In addition, an extension switch 190 is shown. Network switch 100 and extension switch 190 are preferably attached via bridges 143, 187, such that the root complex 112 of the network switch 100 has access to all of the address space within the extension switch 190. The extension switch 190 is simply used to expand the connectivity of the network switch 100. As such, it consists of a plurality of non-transparent bridges 186 which can be attached to additional servers, such as server 150b. The root complex 112 is responsible for configuration of all of the non-transparent bridges 186 within the extension switch 190. The root complex 112 is also responsible for enumerating all devices attached to the transparent bridge within this virtual network switch. Thus, the root complex 112 assigns each server attached to the network switch 100 or any attached extension switch 190 a logical address range in its 64-bit address space. FIG. 8 shows that servers may be attached to either the network switch 100 or the extension switch 190. In addition, additional extension switches may be used. These extension switches can be daisy-chained from the previous extension switch 190 via a-bridge, or can attach to the network switch 100 via a transparent bridge.

Referring to FIG. 7, at startup, the CPU 111 of the network switch 100 configures the base address register (BAR) in the configuration space of the NTB 140a to map the entire system memory 153 of Server 150a to a memory segment within the 64-bit logical address space of the RCP 110 of the network switch 100. In other words, the RCP 110 of the network switch 100 has the ability to access all of the physical memory 153 located within server 150a. In other embodiments, the configuration space in the NTB 140*a* may be configured to only be able to access a portion of the physical memory 153 within the server 150*a*. Similarly, the CPU 111 of the network switch 100 configures the base address register (BAR) in the configuration space of NTB 140*b* to map the entire system memory 163 of Server 150*b* to a second memory segment within the logical address of the RCP 110. This configuration step repeats for each server connected to a NTB 140 of the network switch 100.

Figure 9:
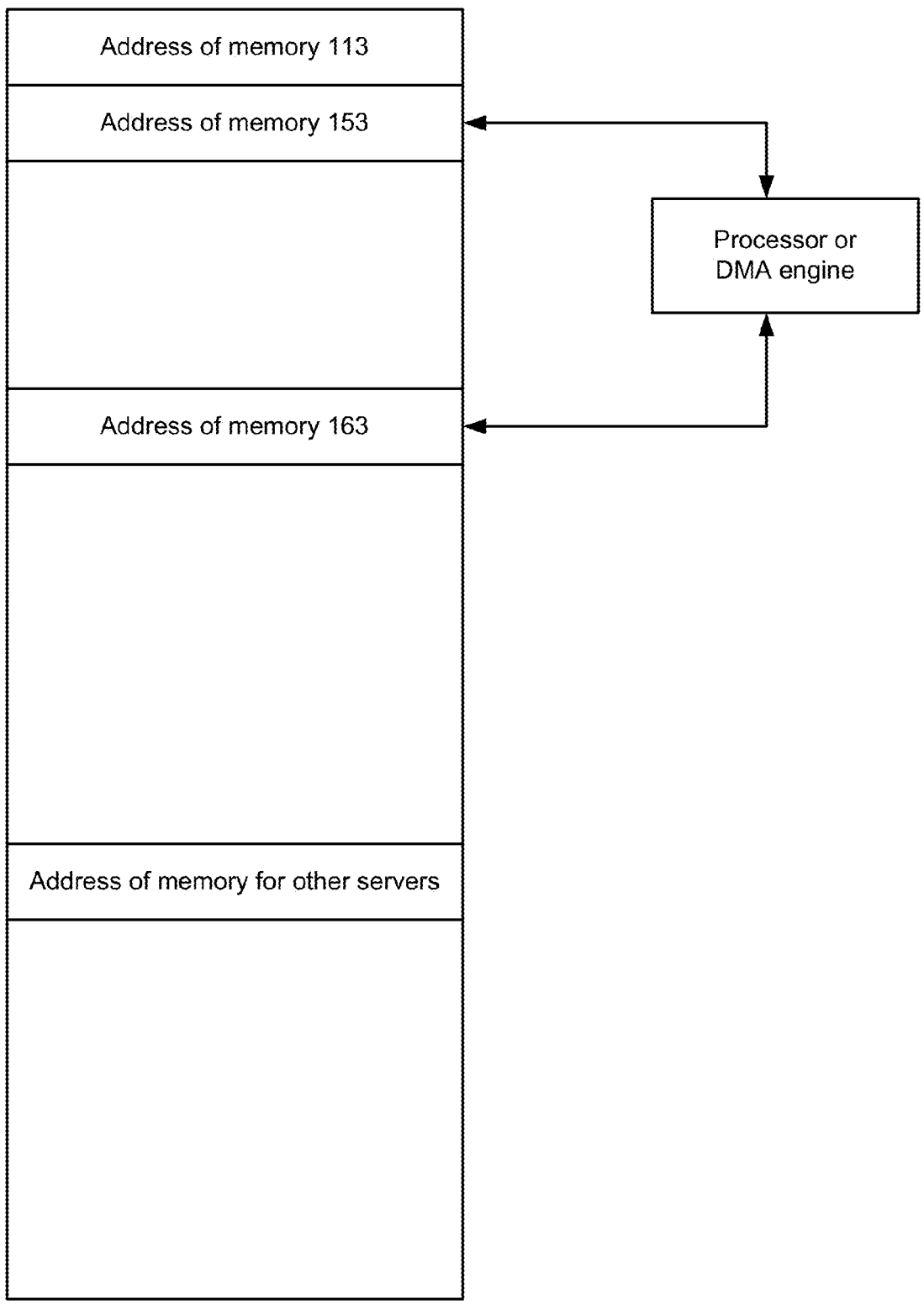
FIG. 9 shows a representative logical address map for the network switch of FIG. 6.

In this way, the RCP 110 of the network switch 100 potentially has access to all of the physical memories 153,163 of each of the servers 150 to which it is attached. This enables the network switch 100 to facilitate the transfer of data from any server 140 to any other server very efficiently. FIG. 9 shows a representative logical address space for the CPU 111 of network switch 100. Note that the memory of each server 150 is mapped into the address space of the network switch 100. In FIG. 9, the address shown for memory space 113 is that of the physical memory of network switch, which is part of the 64-bit logical address space of the network switch.

At configuration or boot time, the RCP 110 of the network switch 100 may emulate a DHCP device, whereby it assigns IP addresses to every server 150 attached to the network switch 100. This may be accomplished by using the Messaging Registers and Doorbell Registers inherent in the NTB 140. As the RCP 110 assigns network addresses, it creates a table storing the IP address of each device and its associated port or NTB 140.

In another embodiment, the RCP 110 does not assign IP addresses to the servers attached to it. Rather, it uses the Messaging Registers and Doorbell Register to interrogate each device as to its previously assigned IP address. As was done above, the RCP 110 then builds a table storing IP addresses and associated ports or NTBs for each attached device.

Referring to FIG. 7, in operation, the CPU 151 of server 150*a* creates a TCP/IP datagram or message and writes the data into the system memory 153. The TCP/IP datagram or message is then transmitted to the destination server and written into its system memory 163. This operation can be performed in a variety of ways. For example, the network switch 100 may utilize its processor 111 to copy the data from one memory 153 to the other memory 163. This is done by allowing the processor 111 to access the memory 153 using the logical address space that has been previously configured, as shown in FIG. 9. The processor then moves this data to the second server 150*b*, by writing the data using the logical address space that has been configured for memory 163. In other embodiments, the network switch 100 also comprises a direct memory access (DMA) engine, which can be programmed with a starting address and length, and can automatically read the data through NTB 140*a* at a first set of addresses and write the data through NTB 140*b* at a second set of addresses. FIG. 9 shows the processor or DMA engine moving data from one address space to the other in order to transfer the data between the servers. In either scenario, the data is moved to the memory 163 of server 150*b*. Note that in either case, the data is never stored on the network switch 100. Rather, the network switch 100 serves only as a conduit to move the data from its source to the desired destination.

To implement either of these embodiments, the RCP 111 of the network switch accesses the TCP/IP datagram or message using the NTB 140*a*. The RCP 111 can parse the message to determine the destination IP address of the message. The RCP 111 then accesses its internal lookup table to determine which port is associated with this IP address. The RCP 111 then simply copies the data from the memory 153 to the memory 163 of the destination server 153*b* using either of the techniques described above. The server 150*b* can then process the received packet.

There are a number of embodiments that can be used to communicate the location of buffers that need to be transmitted from server 150*a*. Similarly, there are a number of embodiments that can be used to communicate the location of the buffers in the destination server 150*b* where incoming packets should be stored.

In one embodiment, each server has a transmit list, which includes a pointer to each packet that needs to be transmitted. In some embodiments, this list may be a ring, although this is not required. Other embodiments include a linked list or a double-linked list. In some embodiments, the transmit list contain pointers to the buffers to be transmitted and does not contain the actually data to be sent.

As new datagrams or packets are created and readied for transmission, the transmitting server 150*a* updates the tail of the transmit list with the address of the new packet in memory 153. This action is made aware to the network switch 100, such as via Doorbell Registers or Messaging Registers in the non-transparent bridge 140*a*. When the network switch 100 transmits a packet to the destination server 150*b*, it updates the head of the transmit list to the next item. In this way, the transmitting server 150*a* and the network switch 100 cooperate to populate and remove entries from the transmit list. When the head of the transmit list is equal to the tail of the transmit list, the network switch 100 knows that there are no packets ready for transmission.

In some embodiments, the transmit list is located in the server 150*a*. In some embodiments, the parameters representing the head of the transmit list and the tail of the transmit list are stored on both the transmitting server and the network switch using shadow copies to minimize costly remote read operations.

Furthermore, in some embodiments, the transmitting server maintains a transmit list for each possible destination server. This minimizes head of line blocking that may result from a busy server. In other embodiments, a single transmit list is used for all possible destinations.

The receiving operation is performed in a similar way. The receive list may be organized as a ring, a linked list, or a double-linked list. The receive list may have a head, a tail and a free pointer. The head of the receive list is the next packet which has already been moved by the network switch 100 and must be processed by the receiving server 150*b*. This value is updated by the receiving server. The tail of the receive list is the last packet on the list, and is updated by the network switch 100. The free pointer is a pointer to the location in the receiving server's memory to where the network switch 100 should transfer the next incoming datagram or packet. This pointer is created and updated by the receiving server 150*b*. When the head and tail are equal, the receive list is empty.

When the network switch 100 moves a packet to a receiving server 150*b*, it updates the head of the receive list, and notifies the receiving server 150*b* that a packet has been transmitted, such as via the Doorbell and Messaging Registers in the non-transparent bridge 140*b*. In another embodiment, the servers 150 and the network switch 100 all are connected via a standard network connection, such as Ethernet. In this embodiment, the notification between the servers 150 and the network switch 100 take place using the network connection.

The above embodiments utilize the root complex 112 of the network switch 100 to move data from one server 150a to another server 150b. However, in some embodiments, the CPU 151 of server 150a may be used to push the TCP/IP datagram or message to the server 150b. In a first embodiment, the network switch 100 assigned a specific portion of its memory 113 to each server 150. This is done by configuring the non-transparent bridges 140 attached to each server with a physical address range in its system memory 113. In this embodiment, the server 150a, rather than creating the datagram in its own memory, actually creates the message in a portion of the system memory 113 in the network switch 100.

Once the datagram is assembled in the system memory 113, the root complex 110 can determine the destination IP address as described above. In one embodiment, it then copies the message directly to the memory in the destination server. In another embodiment, it moves the datagram to another portion of its own memory 113 which is associated with the destination server and alerts the destination server of its presence. The destination server can then read the message using the address range assigned to its non-transparent bridge. In either scenario, the processor 111 moves data from one section of its own memory to another section of memory.

In yet another embodiment, a combination of these approaches is used, whereby the network switch 100 acts as the data mover in certain transactions, while the servers 150 utilizes the system memory of the network switch 100 for other operations.

In another embodiment, the network switch 100 is made aware of the destination server of a datagram that the transmitting server wants to communicate with. This can be done using the Messaging and Doorbell registers in the NTB 140a. In other embodiments, the network switch 100 can snoop the data in the transmitting server's memory and determine the destination server based on the IP address. In other embodiments, the network switch 100 becomes aware via a message from the transmitting server that is delivered via an Ethernet connection. The network switch 100 can then modify the Base Address Registers in the non-transparent bridges 140 to allow the write cycles from the transmitting server to be captured by the NTB associated with the destination server. In this way, the transmitting server actually writes directly to the destination server's memory.

The network switch 100 can also be used to cluster servers together. In many instances, especially in the area of supercomputing, servers and computers need to transfer data amongst themselves at wire speeds. In such instances, these systems cannot allow for any processing overhead associated with higher-level communication protocols. In these scenarios, the servers communicate with each other in point-to-point fashion without necessarily being part of a network. Often times, this point-to-point interconnect is of a proprietary nature, unique to that particular system vendor.

Figure 10:
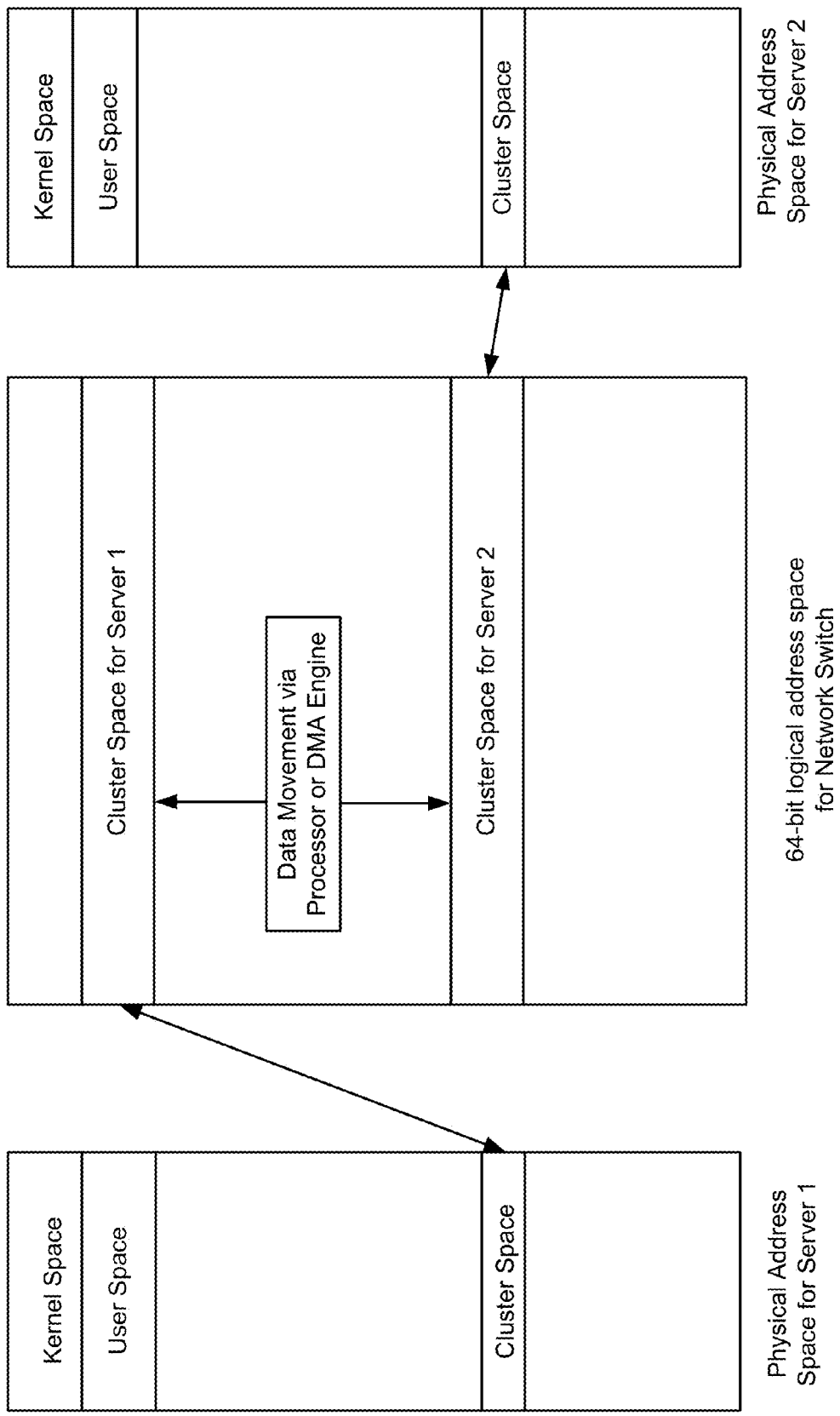
FIG. 10 shows the memory spaces for two clustered servers and the network switch according to one embodiment.

There are several methods by which the network switch 100 can facilitate server-to-server communications. In one embodiment, the network switch 100 serves to moves data between the memories of two servers, in much the same way as described above for TCP/IP transmissions. At configuration or boot time, the network switch 100 sets up the base address registers (BAR) in the various non-transparent bridges 140, such that each occupies a different address space within the 64-bit logical address space. This, as was done above, allows the network switch 100 to view memories 153, 163, or at least a portion of those memories. FIG. 10 shows the logical address space for the network switch 100, and the corresponding physical address spaces for servers 150a, 150b.

In one embodiment, the network switch 100 then uses the Messaging Registers or Doorbell Registers of the non-transparent bridges 140a, 140b to communicate with the servers 150a, 150b. In another embodiment, the servers 150 and the network switch 100 all are connected via a standard network connection, such as Ethernet. In this embodiment, the communication between the servers 150 and the network switch 100 take place using the network connection. In this way, the network switch can determine the identifier information for each server in the cluster. As was performed above, the network switch 100 stores this information in a lookup table that associates server identifier information with a non-transparent bridge or port. The network switch 100 then moves the data from one server to another, using essentially the same technique as described above. As shown in FIG. 10, the processor 111 or a DMA engine in the network switch 100 may be used to copy the data from the cluster space of server 1 to the cluster space of server 2. In other words, the transfer of data in Cluster mode may be performed by the Network Switch RCP 110 either in PIO mode or using a DMA engine associated with the NTB port, operating under the control of the Network Switch RCP 110. Therefore, the Network Switch 100 can copy data from any server's memory 153 to another server's memory 163 in PIO mode where each server's cluster space is mapped into various memory windows of the logical address space of the Network Switch RCP 110. In another embodiment, the DMA engines that are associated with each NTB port are utilized so that there can be simultaneous transfers of data from server to server occurring with arbitration taking place in the PCIe Switch 120 or extension Switch 190 attached to all of the NTB ports.

In the case of a two server cluster, a lookup table may not be necessary, as it is clear what the destination of all communications is. However, in the case of clusters having three or more servers, the network switch 100 may use the identifier information to determine the destination server for a particular communications. In yet another embodiment, each server may set up multiple address spaces, where each is associated with a particular clustered server.

In another embodiment, the network switch 100 facilitates the creation of a cluster tunnel between two servers. In this embodiment, the CPU 111 of the network switch 100 configures the BAR of the non-transparent bridges 140a, 140b to such that server 150a can write and read directly from memory in server 150b. This is achieved by mapping the cluster space of both servers to the same logical address range. At the request of one server, the processor 111 of the network switch 100 can configure the BAR of the two non-transparent bridges to map to the same address. If server 150a attempts to write data, the translated address in the address space of the network switch 100 will be that of the cluster space of the second server Thus, the second NTB 140b will capture this write operation and forward it to the second server 150b. Similarly, reads or writes from the second server 150b would be captured by the NTB 140a and passed to the first server 150a, as shown in FIG. 10. In this embodiment, the network switch 100 is not involved in actual data transfers. However, it may be involved in passing interrupts between the devices, or passing messages between clustered servers. In some instances, these messages, but preferably not data, can be transferred via an Ethernet legacy network connecting the servers).

Figure 11:
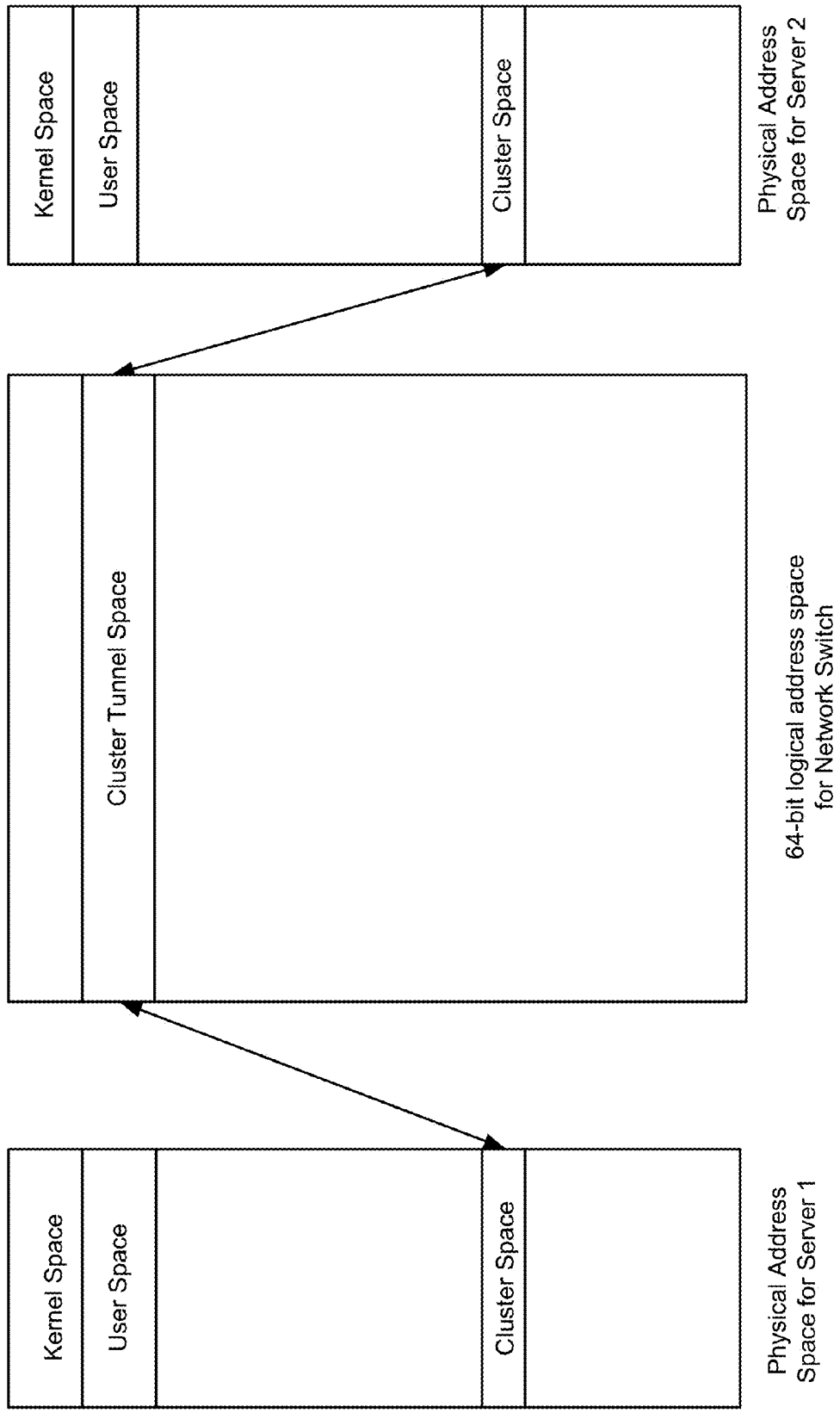
FIG. 11 shows the memory spaces for two clustered servers and the network switch according to a second embodiment.

Although FIG. 11 shows two servers sharing a cluster tunnel, the disclosure is not limited to this embodiment. An arbitrary number of servers can share a single tunnel.

In another embodiment, the network switch 100 configures any number of the non-transparent bridges 140 to access a single portion of its physical memory 113. In this way, each server that is configured in this way can access a common portion of physical memory in the network switch 100. This allows multiple servers to access the same physical memory 113 using the arbitration functionality resident on the PCIe switch 120 on the network switch. One application of this method would be accessing a common memory made up of solid state devices, thereby, providing multiple server access to the same physical memory with arbitration on concurrent accesses performed by the PCIe Switch resident on the Network Switch.

In many instances, it is beneficial for various servers in a datacenter, or other, environment to use the same I/O device for their respective applications. A software technique known as I/O virtualization allows a set of I/O controllers and devices to be shared by a plurality of servers.

This technique allows multiple operating systems operating on the same or different processor platforms to access a single I/O hardware device. These operating systems in this shared I/O access architecture may be referred to as "Guest Operating Systems".

A specially designed software application virtualizes a set of hardware to the Guest Operating Systems of various servers. In other words, this application, which may be referred to as middleware, makes it appear to each server having a Guest Operating System that it is the exclusive owner of the I/O device whenever it tries to access the I/O device. In other words, there are multiple virtual paths between various servers and the I/O device, however each server is only aware of its own path and does not realize that the I/O device is actually being shared among servers.

To achieve this, the middleware saves the full context of the I/O device, including the state of the I/O hardware registers and other volatile parameters associated with the device as well as the host processor, whenever it switches the path to the I/O device from one server to another. When it is time to switch the path back to the original server, the middleware retrieves the saved context and applies them as required thereby making the transition between server graceful and seamless. The middleware can make use of Messaging and Doorbell Registers to notify other servers of its desire to access an I/O device. In another embodiment, the servers 150 and the network switch 100 all are connected via a standard network connection, such as Ethernet. In this embodiment, the notification between the servers 150 and the network switch 100 may take place using that network connection. The middleware running on each of the other servers will receive this message. Some type of arbitration may be used to determine the next virtual owner of the I/O device. In another embodiment, the middleware of each server requests use of the I/O device from the network switch 100, which contains the arbitration logic and determines the next "owner" of the I/O device. The network switch then relays its decision to the other servers using the Messaging and Doorbell Registers.

This technique is predicated on the need for a reliable electrical connection for dataflow between these servers and the I/O controllers. The present network switch 100 can also be used to provide that electrical connection between a plurality of servers and I/O controllers and devices.

Figure 12:
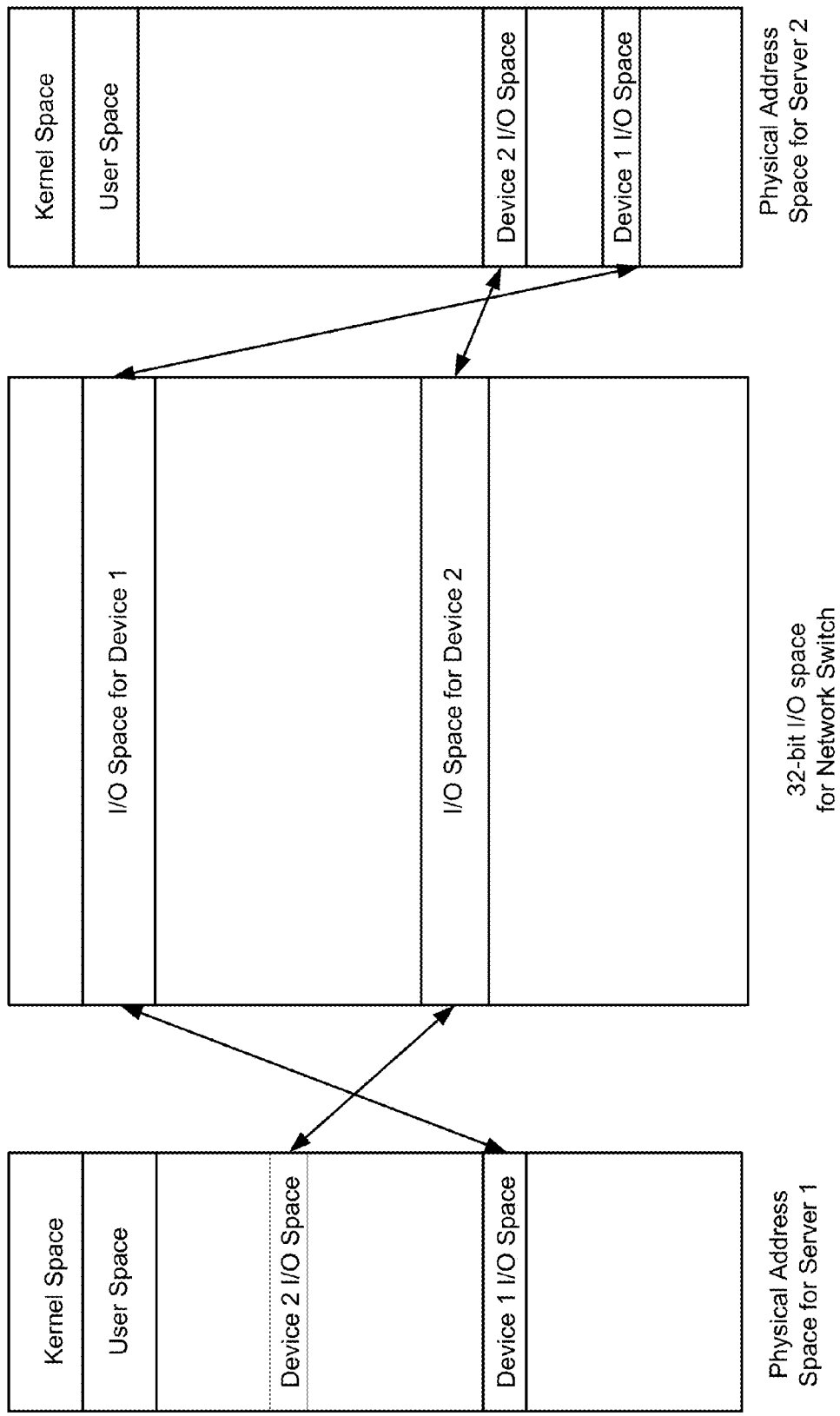
FIG. 12 shows the I/O space for two servers accessing a I/O device attached to a network switch.
Figure 13:
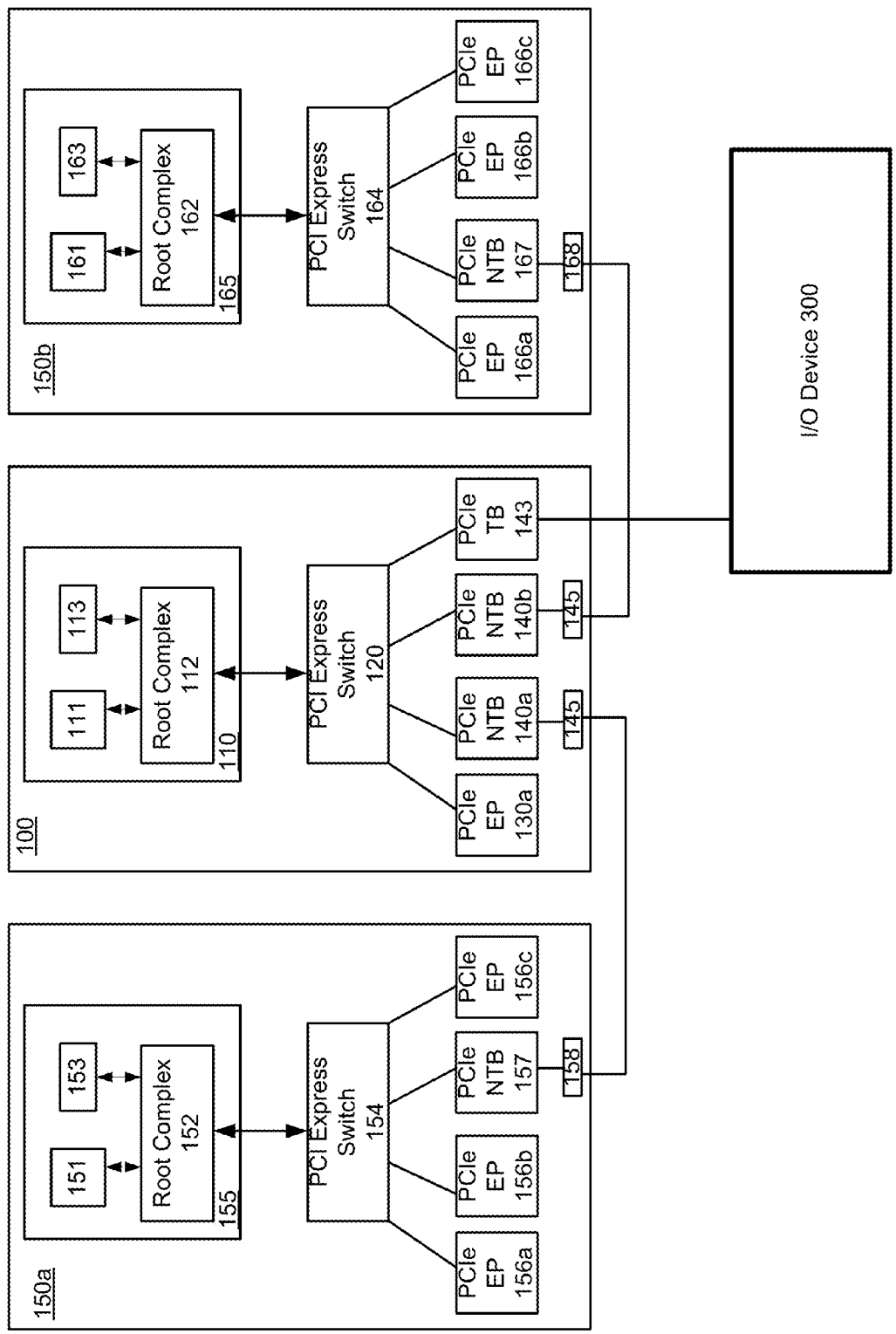
FIG. 13 shows a schematic view of a network switch with attached I/O devices and attached servers.

In one embodiment, shown in FIGS. 12 and 13, the network switch 100 configures the non-transparent bridge 140a base address for I/O address routing registers (BAR) to allow server 150a to access I/O device 1 and I/O device 2. It similarly configured non-transparent bridge 140b base address registers (BAR) to allow server 150b to access I/O device 1 and I/O device 2. The I/O space used by the two servers 150a, 150b to represent the actual I/O devices need not be the same. One example of this is shown in FIG. 12. In this embodiment, server 150a and server 150b have allocated a portion of their I/O space to the devices such that the I/O devices occupy different spaces in their respective physical address maps. However, through the translations performed by the network switch 100, both servers 150a, 150b are able to access the same I/O space in the network switch 100.

The I/O devices are enumerated by the network switch RCP 111. The Network Switch 100 also builds a unique ID Translation Look Up Table (LUT) per NTB port connected to individual servers. In this way, the controlling server will recognize the ID of the I/O device it is engaged with at any given point in time. The building of the LUT is carried out at boot or configuration time using communication through message and doorbell registers or through an Ethernet connection between servers and the network switch.

FIG. 13 shows one embodiment of the interconnections between the servers 150a, 150b, the network switch 100 and an I/O device 300. As was described above, the network switch 100 is attached to the servers 150a, 150b through use of non-transparent bridges 140a, 140b. An I/O Device 300 is attached to the network switch 100 through a transparent bridge 143, such that it is discovered and enumerated by the network switch 100 during initialization. After that time, when server 150a wishes to access the I/O device 300, it accesses the I/O space configured in the non-transparent bridge 140a. This access is then received by the I/O device 300, as this is its I/O address range. Similarly, server 150b accesses the I/O Device 300 using the I/O space configured in non-transparent bridge 140b. In this way, the root complex of the network switch 100 is not involved in I/O transactions to the I/O device 300.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes.

What is claimed is:

1. A system for area network communication, comprising:
    a plurality of servers, wherein each server is PCI Express compatible;
    a network switch, wherein the network switch comprises:
        a PCI Express switch with a plurality of bridge connectors;
        a central processing unit;
        a root complex, wherein said root complex connects the PCI Express switch to said central processing unit; and
        a memory component;
    a plurality of PCIe-compliant cables, wherein each of the plurality of cables connects each of the plurality of servers to each of the plurality of bridge connectors on the PCI Express switch within the network switch; and a respective non-transparent bridge disposed between the PCI Express switch and each of the plurality of servers and in communication with a respective one of the PCIe-compliant cables;

wherein each connection between one of the plurality of servers and the network switch establishes communication between the respective server and the rest of the plurality of servers without the need to convert from PCI Express technology and wherein a routing application is stored in a memory device disposed in the network switch, and wherein a packet comprises a destination address, and the central processing unit routes the packet from the respective server to one of the rest of the plurality of servers through one of the non-transparent bridges, based on the destination address, using the routing application.

2. The system of claim 1, wherein the PCI Express switch includes data buffer hardware resources and said network switch uses said data buffer hardware resources of said PCI Express switch to augment the data buffering functions needed to facilitate routing data between servers.

3. The system of claim 1, wherein each server includes an Internet Protocol (IP) layer for establishing IP addresses, wherein the routing application uses the IP addresses to route the packet.

* * * * *